United States Patent
Kamavaram et al.

(10) Patent No.: US 12,034,180 B1
(45) Date of Patent: Jul. 9, 2024

(54) MULTI LAYERED NANOSTRUCTURED MATERIALS FOR IONIC AND ELECTRONIC TRANSPORT IN CHEMICAL AND ELECTROCHEMICAL DEVICES

(71) Applicant: Oceanit Laboratories, Inc., Honolulu, HI (US)

(72) Inventors: Venkat Kamavaram, Honolulu, HI (US); Ganesh Kumar Arumugam, Honolulu, HI (US); Sumil Singh Thapa, Honolulu, HI (US)

(73) Assignee: Oceanit Laboratories, Inc., Honolulu, HI (US)

( * ) Notice: Subject to any disclaimer, the term of this patent is extended or adjusted under 35 U.S.C. 154(b) by 543 days.

(21) Appl. No.: 16/243,877

(22) Filed: Jan. 9, 2019

Related U.S. Application Data

(60) Provisional application No. 62/615,415, filed on Jan. 9, 2018.

(51) Int. Cl.

| | |
|---|---|
| *H01M 50/403* | (2021.01) |
| *H01M 10/0525* | (2010.01) |
| *H01M 50/414* | (2021.01) |
| *H01M 50/42* | (2021.01) |
| *H01M 50/423* | (2021.01) |
| *H01M 50/44* | (2021.01) |
| *H01M 50/454* | (2021.01) |

(52) U.S. Cl.
CPC ....... *H01M 50/44* (2021.01); *H01M 10/0525* (2013.01); *H01M 50/403* (2021.01); *H01M 50/414* (2021.01); *H01M 50/42* (2021.01); *H01M 50/423* (2021.01); *H01M 50/454* (2021.01)

(58) Field of Classification Search
CPC .......................... H01M 50/44; H01M 50/449
See application file for complete search history.

(56) References Cited

U.S. PATENT DOCUMENTS

| | | | |
|---|---|---|---|
| 7,112,389 B1 * | 9/2006 | Arora | H01M 50/411 429/128 |
| 10,658,650 B2 * | 5/2020 | Shibutani | H01M 10/05 |
| 2006/0046122 A1 * | 3/2006 | Chang | H01M 8/1004 429/482 |
| 2008/0150556 A1 * | 6/2008 | Han | B82Y 15/00 977/762 |

(Continued)

FOREIGN PATENT DOCUMENTS

| | | | | |
|---|---|---|---|---|
| EP | 1911864 A1 * | 4/2008 | | B01D 71/64 |
| JP | 2007-245712 | * | 9/2007 | |
| WO | WO-2017043178 A1 * | 3/2017 | | H01M 10/04 |

*Primary Examiner* — Maria Laios
(74) *Attorney, Agent, or Firm* — Fresh IP PLC; Clifford D. Hyra; Aubrey Y. Chen

(57) ABSTRACT

The invention relates to nanostructured hybrid polymer composite membranes and methods for producing same. Specifically, the invention relates to nanofiber membranes produced through various methods, including electrospinning of at least one polymer into a non-woven nanofiber structure. The disclosed nanofiber membranes may also be compressed to further provide unique physical, chemical, and thermal properties that make such membranes suitable for a range of specific applications, including, but not limited to, use as nanostructured separators in lithium-ion batteries.

27 Claims, 5 Drawing Sheets

(56) References Cited

U.S. PATENT DOCUMENTS

| | | | | |
|---|---|---|---|---|
| 2010/0136865 A1* | 6/2010 | Bletsos | ............... | D06M 10/10 |
| | | | | 442/60 |
| 2010/0292623 A1* | 11/2010 | Greiner | ............... | A61L 31/129 |
| | | | | 428/221 |
| 2012/0028086 A1* | 2/2012 | Shi | ................. | H01G 11/52 |
| | | | | 429/50 |
| 2012/0178332 A1* | 7/2012 | Uchida | ............. | C08L 77/10 |
| | | | | 442/351 |
| 2013/0101918 A1* | 4/2013 | Yandrasits | ............. | C08J 5/2206 |
| | | | | 429/492 |
| 2015/0174806 A1* | 6/2015 | Wong | ............... | B29C 48/022 |
| | | | | 442/366 |
| 2019/0140237 A1* | 5/2019 | Kaye | ............... | B32B 15/18 |

\* cited by examiner

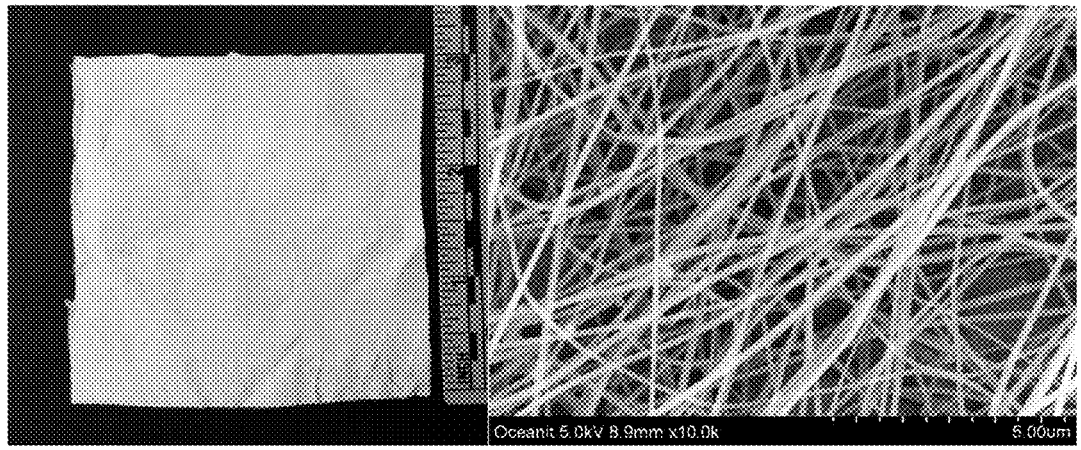
FIG. 1A  FIG. 1B
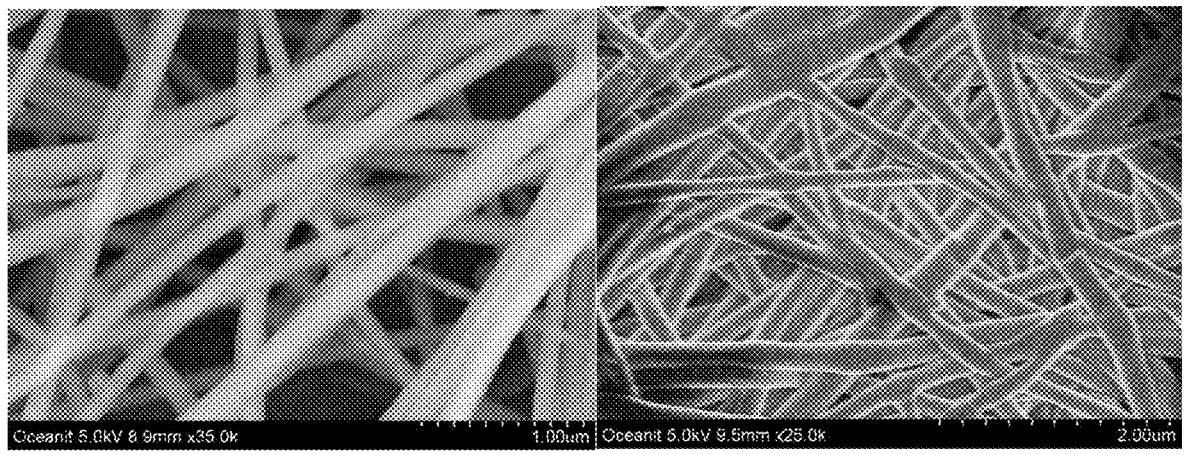
FIG. 2A  FIG. 2B

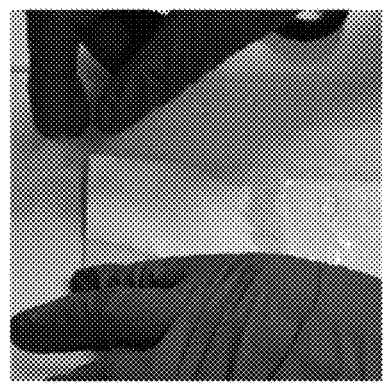
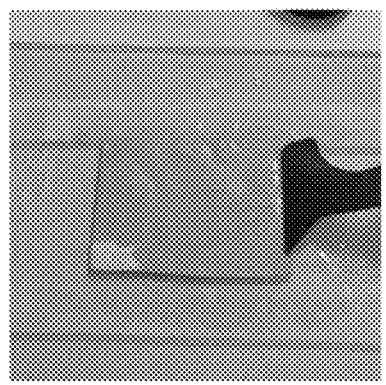
FIG. 3A    FIG. 3B
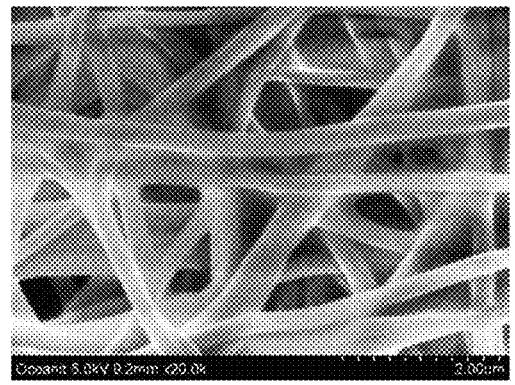
FIG. 3C
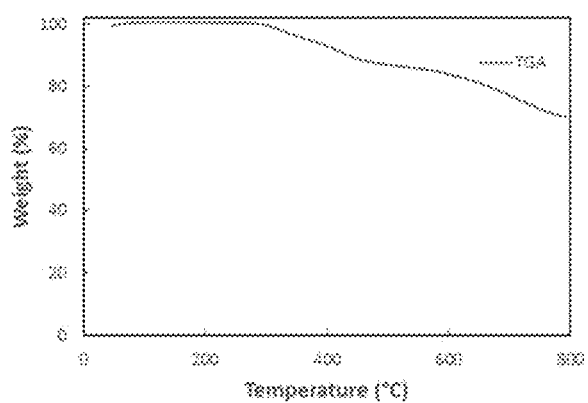
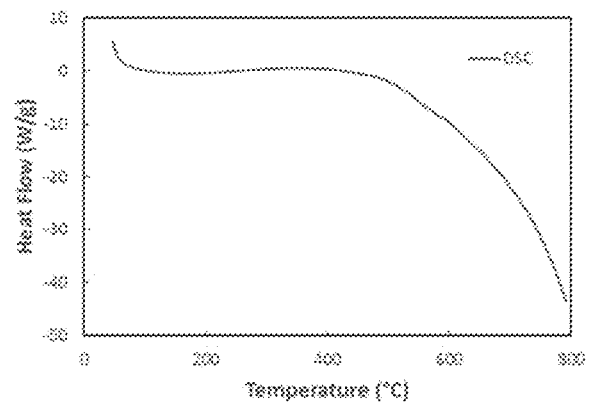
FIG. 4A    FIG. 4B

27 °C  200 °C  300 °C

MULTI LAYERED NANOSTRUCTURED MATERIALS FOR IONIC AND ELECTRONIC TRANSPORT IN CHEMICAL AND ELECTROCHEMICAL DEVICES

CROSS-REFERENCE TO RELATED APPLICATIONS

This application claims the benefit of U.S. Provisional Application No. 62/615,415, filed Jan. 9, 2018, which is incorporated by reference herein in its entirety.

This invention was made with United States government ("Government") support under contract N68335-16-C-0252, awarded by the Naval Air Warfare Center (PAX). The Government has certain rights in this invention.

FIELD OF THE INVENTION

The application relates to the fields of electrochemical energy generation and storage devices such as batteries, including, without limitation, lithium ion batteries, capacitors, fuel cells, and the like.

The application also relates to chemical processes, including, but not limited to, chemical filtration, chemical separation, osmosis, desalination, distillation, gas separation, ion transport, and the like.

BACKGROUND

Lithium ion ("Li-Ion") batteries are a rapidly growing market, which is expected to reach U.S. $46 billion by the year 2022. Such rapid growth is being driven by demand in both the civilian and military sectors for battery-powered applications, such as electric vehicles, consumer electronics, and energy storage.

Purely as a non-limiting example, naval forces have a special need for Li-Ion batteries for use in their power systems, directed energy weapons, electric vehicles, and current and future unmanned air vehicles ("UAV"). However, despite increasing demand, the Li-Ion battery industry is struggling to develop safe, high-performance, and cost-effective battery separator technology. Indeed, recent high-profile incidents, such as various smartphone devices, including the Samsung Galaxy Note 7, exploding due to Li-Ion battery overheating, clearly illustrate the need for better battery separator technology. These examples of Li-Ion battery failure reveal the need for novel and effective solutions that do not currently exist in today's marketplace, including solutions to maintain safety and performance of Li-Ion batteries for an extended duration.

In particular, the separator is one major aspect of the Li-Ion battery that needs significant improvement in order to offer safety and reliability. Currently, polyolefin-based materials made from an extrusion process, non-woven fabrics, and ceramic separators are used for Li-Ion battery separators. However, all such aforementioned technologies have insufficient high-temperature separator stability, safety, fire resistance, and wettability for many applications. Additionally, all such aforementioned technologies are prone to mechanical failure. Purely as a non-limiting example, porosity and chemical functionality can often not be adequately controlled.

Given all of the above information, there exists a need for improved materials and methods for electrochemical energy generation and storage, including, without limitation, Li-Ion batteries and Li-Ion battery separators.

SUMMARY

It is to be understood that both the following summary and the detailed description are exemplary and explanatory and are intended to provide further explanation of the invention as claimed. Neither the summary nor the description that follows is intended to define or limit the scope of the invention to the particular features mentioned in the summary or in the description.

In general, embodiments of the present invention are directed towards an innovative, nanostructured hybrid polymer composite membrane. Such membrane has controllable surface properties (including wettability and chemical reactivity), tunable porosity, high ionic conductivity, and superior thermal stability. Additionally, embodiments of the present invention relate to methods of producing a nanostructured hybrid polymer composite membrane, which may comprise electrospinning of a polymer, or a mixture of two or more compatible polymers, into a non-woven nanofiber membrane. One of skill in the art will appreciate that nanofiber membranes may be produced using several approaches, including, but not limited to, melt spinning, melt-blowing technology, and melt electrospinning. However, electrospinning produces high quality nanofibers of several different kinds of polymers. In some embodiments of the present invention, the at least one polymer may comprise a mixture of two or more compatible polymers. It should be appreciated that the non-woven nanofiber membrane created by methods embodying the present invention provide unique physical, chemical, and thermal properties. It should further be appreciated that such non-woven nanofiber membranes may be tailored for specific applications by tuning the physical and chemical nature of the materials used.

The present invention provides several benefits, including, but not limited to, improving the porosity for faster/more efficient ion transport, a three-dimensional (3D) network that provides a tortuous path and improves electrical resistance and dendrite growth mitigation in battery applications, high temperature stability to minimize fire and/or explosion risks, improved battery safety at high temperatures, high temperature chemical separations, control over chemical functionality to improve chemical species migration, and improved wettability for selective separation.

BRIEF DESCRIPTION OF THE DRAWINGS

The accompanying drawings, which are incorporated herein and form a part of the specification, illustrate exemplary embodiments and, together with the description, further serve to enable a person skilled in the pertinent art to make and use these embodiments and other embodiments that will be apparent to those skilled in the art.

FIGS. 1A-B show electrospun nanofiber material in both a photograph (FIG. 1A) and a scanning electron micrograph image (FIG. 1B), according to an embodiment of the present invention.

FIGS. 2A-B show a nanofiber membrane in both spun (FIG. 2A) and compressed (FIG. 2B) states that impact porosity of the membrane, according to an embodiment of the present invention.

FIGS. 3A and 3B show a nanofiber membrane infiltrated with polymer to control pore size of the membrane, according to an embodiment of the present invention. Further, FIG. 3C is a scanning electron microscope image of a polymer-infiltrated membrane, according to an embodiment of the present invention.

FIGS. 4A-B are thermogravimetric analysis (TGA) and differential scanning calorimeter (DSC) profiles, respectively, of a nanofiber membrane according to an embodiment of the present invention.

(FIG. 5B), and 300° C. (FIG. 5C).

DETAILED DESCRIPTION

Figure 5A:
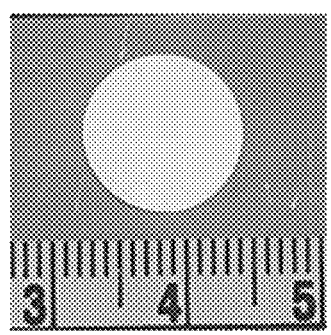
FIGS. 5A-C show thermal shrinkage of a nanofiber membrane according to an embodiment of the present invention at different temperatures, specifically at room temperature (FIG. 5A), 200° C.

The present invention is more fully described below with reference to the accompanying figures. The following description is exemplary in that several embodiments are described (e.g., by use of the terms "preferably," "for example," or "in one embodiment"); however, such should not be viewed as limiting or as setting forth the only embodiments of the present invention, as the invention encompasses other embodiments not specifically recited in this description, including alternatives, modifications, and equivalents within the spirit and scope of the invention. Further, the use of the terms "invention," "present invention," "embodiment," and similar terms throughout the description are used broadly and not intended to mean that the invention requires, or is limited to, any particular aspect being described or that such description is the only manner in which the invention may be made or used. Additionally, the invention may be described in the context of specific applications; however, the invention may be used in a variety of applications not specifically described.

In the several figures, like reference numerals may be used for like elements having like functions even in different drawings. The embodiments described, and their detailed construction and elements, are merely provided to assist in a comprehensive understanding of the invention. Thus, it is apparent that the present invention can be carried out in a variety of ways, and does not require any of the specific features described herein. Also, well-known functions or constructions are not described in detail since they would obscure the invention with unnecessary detail. Any signal arrows in the drawings/figures should be considered only as exemplary, and not limiting, unless otherwise specifically noted. Further, the description is not to be taken in a limiting sense, but is made merely for the purpose of illustrating the general principles of the invention, since the scope of the invention is best defined by the appended claims.

It will be understood that, although the terms first, second, etc. may be used herein to describe various elements, these elements should not be limited by these terms. These terms are only used to distinguish one element from another. Purely as a non-limiting example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an," and "the" are intended to include the plural forms as well, unless the context clearly indicates otherwise. It should also be noted that, in some alternative implementations, the functions and/or acts noted may occur out of the order as represented in at least one of the several figures. Purely as a non-limiting example, two figures shown in succession may in fact be executed substantially concurrently or may sometimes be executed in the reverse order, depending upon the functionality and/or acts described or depicted.

Ranges are used herein in shorthand, so as to avoid having to list and describe each and every value within the range. Any appropriate value within the range can be selected, where appropriate, as the upper value, lower value, or the terminus of the range.

The words "comprise", "comprises", and "comprising" are to be interpreted inclusively rather than exclusively. Likewise the terms "include", "including" and "or" should all be construed to be inclusive, unless such a construction is clearly prohibited from the context. The terms "comprising" or "including" are intended to include embodiments encompassed by the terms "consisting essentially of" and "consisting of". Similarly, the term "consisting essentially of" is intended to include embodiments encompassed by the term "consisting of". Although having distinct meanings, the terms "comprising", "having", "containing" and "consisting of" may be replaced with one another throughout the description of the invention.

"About" means a referenced numeric indication plus or minus 10% of that referenced numeric indication. For example, the term about 4 would include a range of 3.6 to 4.4. At the very least, and not as an attempt to limit the application of the doctrine of equivalents to the scope of any claims, each numerical parameter should be construed in light of the number of significant digits and ordinary rounding approaches.

Wherever the phrase "for example," "such as," "including" and the like are used herein, the phrase "and without limitation" is understood to follow unless explicitly stated otherwise.

"Typically" or "optionally" means that the subsequently described event or circumstance may or may not occur, and that the description includes instances where said event or circumstance occurs and instances where it does not.

Generally, the present invention relates to multi-layered nanostructured materials for ionic and electronic transport in chemical and electrochemical devices. In particular, the invention is directed towards an innovative, nanostructured hybrid polymer composite membrane that has controllable surface properties (including wettability and chemical reactivity), tunable porosity, high ionic conductivity, and superior thermal stability. Embodiments of the present invention also encompass methods of producing a nanostructured hybrid polymer composite membrane, which may comprise electrospinning of at least one polymer into a non-woven nanofiber membrane. One of skill in the art will appreciate that nanofiber membranes may be produced using several approaches, including, but not limited to, melt spinning, melt-blowing technology, and melt electrospinning. However, electrospinning produces high quality nanofibers of several different kinds of polymers. In some embodiments of the present invention, the at least one polymer may comprise a mixture of two or more compatible polymers. It should be appreciated that the non-woven nanofiber membrane created by methods embodying the present invention provide unique physical, chemical, and thermal properties. It should further be appreciated that such non-woven nanofiber membranes may be tailored for specific applications by tuning the physical and chemical nature of the materials used.

The present invention provides several benefits, including, but not limited to, improving the porosity for faster/more efficient ion transport, a three-dimensional (3D) network that provides a tortuous path and improves electrical resistance and dendrite growth mitigation in battery applications, high temperature stability to minimize fire and/or explosion, improved battery safety at high temperatures, high temperature chemical separations, control over chemical functionality to improve chemical species migration, and improved wettability for selective separation.

Purely as a non-limiting example, the nanofiber membrane created by methods embodying the present invention may be used as Li-Ion battery separators. When used in such fashion, the nanofiber membrane exhibits superior properties as compared to existing separator technologies. Existing Li-Ion battery separators have relied heavily on using polymer-based materials, which lack high temperature stability to operate safely under fast charge/discharge conditions. Novel battery separators may be produced from one or more unique high temperature polymers through a controlled fiber-spinning process, thereby yielding flexible nanofiber membranes for use in separator applications.

High temperature polymers that may be used in Li-Ion battery separators include, but are not limited to, polybenzimidazole (PBI), polyether ether ketone (PEEK), polysulfone and polyethylenimine (PEI), polyvinyl alcohol (PVA), and others. However, current polymer nanofiber processing technologies are not suitable for fabricating a flexible separator from such high temperature polymers. Electrospinning technology, as disclosed herein and as utilized in an embodiment of the present invention, is suitable for producing separators with unique chemical, physical, and structural aspects to address performance and safety issues that exist in existing separator technology.

A variety of high-temperature polymers may be utilized with the disclosed production methods to arrive at the novel materials developed. One tested polymer combination is of polybenzimidazole-polyvinyl alcohol (PBI-PVA). Polybenzimidazole (PBI) has gained wide recognition in recent years as high temperature polymer. PBI is a thermoplastic polymer and, in molded form, has the highest compressive and tensile strength of any unfilled polymeric resin. PBI has the highest glass transition temperature (425° C.) of any commercially available organic polymer. It has high decomposition temperatures (>600° C.), good oxidation resistance, and excellent strength at cryogenic temperatures. PBI has been extensively studied for methanol-based fuel cells but has not been studied for battery applications since PBI-casted films are brittle. In other applications, PBI-based fire-resistant fabric, specifically designed for military and fire-fighting applications, is commercially available. PBI fibers provide flame and heat resistance, with the added bonus of good strength and flexibility retention after exposure to thermal events.

Polyvinyl alcohol (PVA) is a semi-crystalline polymer whose crystalline index depends on the synthetic process and physical aging. PVA is a water-soluble poly-hydroxy polymer, one of the few linear, non-halogenated aliphatic polymers. PVA has a two-dimensional hydrogen-bonded network sheet structure. The physical and chemical properties of PVA depend to a great extent on its method of preparation. PVA has good thermo-stability, chemical resistance, and film forming ability.

Electrospinning is a fiber production method which uses electric force to draw charged threads of polymer solutions or polymer melts up to fiber diameters on the order of some hundred nanometers. The process does not require the use of coagulation chemistry or high temperatures to produce solid threads from a solution. As a result, the electrospinning process is particularly suited to the production of fibers using large and complex molecules. Electrospinning from molten precursors is also practiced; this method ensures that no solvent can be carried over into the final product.

and FIGS. 1A-B show electrospun nanofiber materials in both a photograph (FIG. 1A) and a scanning electron micrograph image (FIG. 1B), according to an embodiment of the present invention. Initially, multi-layered nanostructured material is fabricated using nanofibers in non-woven or aligned/partially-aligned form into a fabric or membrane form factor, as depicted in FIG. 1A. The non-woven or aligned/partially-aligned form is obtained by an electrospinning or melt spinning process. Nanofibers are produced from single polymer or mixed polymer or polymer-particulate composites compositions. Nanofiber geometry ranges from 20 nm to 500 nm in diameter and 1-10 cm in length, as shown in FIG. 1B. The aspect ratio (L/D) ranges from 1,000 to 1,000,000, which results in unique properties such as nano-size effect, superior high surface area effect, and molecular orientation effect. The non-woven and aligned/partially-aligned form of the nanofibers further results in high porosity due to orientation and electrostatic repulsion creating well-defined spaces and/or porous regions between fibers and layers. The multi-layered structure results in a three-dimensional network structure with highly torturous pore networks, yielding high porosity and gas permeability. The density of fibers that control the effective thickness and porosity of the fabric and/or membrane are controlled using parameters defining the nanofiber production process.

In at least one embodiment according to the present invention, electrospun nanofiber membranes are optimized experimentally for fiber dimensions, fiber density, and thickness using processing parameters such as polymer flow rate (0.001 ml/min), number of nozzles (1-16 outlets), nozzle size (23-20 gauge needles), duration of spinning, and applied voltage (10-40 kV). Purely as a non-limiting example, the polymer composition is 13 wt. % PBI in N, N'-dimethyl acetamide (DMAc). The nanofibers are collected on a conductive substrate, such as aluminum foil, and later lifted off for further processing. It should be appreciated that electrospinning may be quickly scaled up using a hot melt spinning/blow manufacturing process, which is well known to those of skill in the art. It should further be appreciated that there exist cost-effective, commercially available polymer materials.

FIGS. 2A-B show a nanofiber membrane as-spun (FIG. 2A) and compressed (FIG. 2B) to control the porosity, according to an embodiment of the present invention. The nanofiber mat is compressed under loads ranging from 10-50 kN using an Instron universal testing machine (UTM). The compression results in fibers from different layers being compacted to reduce the thickness and resulting porosity of the membrane. Uniform thickness is essential for consistent properties throughout the nanofiber membrane. Such properties include, but are not limited to, physical properties, such as porosity of the membrane, which is directly related to gas, ionic, and chemical species permeability. FIG. 2 shows the nanofiber membrane compressed under a load that results in reduction of porosity as compared to as-spun nanofibers (FIG. 2A). The as-spun nanofibers show porosity in the range of 150-200%, taking into consideration the porosity formed due to non-woven fiber in the layer and the porosity between the layers. By contrast, compressed nanofiber membranes show reduced porosity, about a 50% reduction as compared to as-spun nanofibers.

Porosity is calculated by dividing the volume of the voids/pores between fibers by the volume of the fibers themselves, excluding the voids, which may be determined by fluid saturation/displacement methods. As shown in FIG. 2B, when the fibers are compressed, the layers of the nanofiber membrane are likewise compressed, reducing the porosity, whereby the fibers are bonded in the loading direction. Fiber consolidation or nonwoven bonding processes can interlock preferentially arranged fiber or film assemblies by mechanical, chemical, solvent, and/or thermal means. The degree of bonding is a primary factor in determining membrane integrity (strength), porosity flexibility, softness, and density (loft, thickness).

The product resulting from electrospinning processes is a mat of tangled non-woven nanofibers. In at least one embodiment according to the present invention, nanofiber membranes are compressed at 35 kN to control porosity and obtain uniform thickness.

FIGS. 3A and 3B show a nanofiber membrane infiltrated with polymer to control pore size of the membrane, according to an embodiment of the present invention. Further, FIG. 3C is a scanning electron microscope image of a polymer-infiltrated membrane, according to an embodiment of the present invention. Pore size is another property of the non-woven nanofiber membrane which can be controlled using polymer infiltration or mechanical compression, commonly termed as a fiber bonding process. In the illustrated embodiment, polymer with similar characteristics to the nanofibers is used to bond the fibers to yield optimum physical properties for a specific required application. Alternatively, mechanical or thermal methods can be used to bond the fibers and yield optimum properties.

Purely as a non-limiting example, and in at least one embodiment according to the present invention, as-spun nanofiber membrane was infiltrated with aqueous PVA solution to ensure that the fibers are intact and to reduce porosity. The infiltration process includes spraying and squeezing out the excess solution to obtain a uniform film, as illustrated in FIGS. 3A-3B. Membranes are initially dried at room temperature to prevent shrinkage due to solvent evaporation and later dried in an oven at 80° C. for 6 hours for complete removal of solvent.

The microstructure of polymer-infiltrated membranes shows that the pores are partially filled, resulting in reduced porosity (FIG. 3C). Lower concentrations of polymer, such as, for example, 0.5-1.0 wt. % PVA, ensures that nanofibers are not completely covered with the polymer. Additionally, other high-temperature polymer binders, including, but not limited to, polyacrylamide (Tg=225° C.), polyacrylic acid (190° C.) and polymethacrylic acid (220° C.), polyethylene imine (PEI), silicone, or any thermoplastic elastomeric material may be used. It should be appreciated that use of such high temperature polymer binders increases the temperature range of the nanofiber membrane.

The steps of nanofiber collection, membrane compaction, and polymer infiltration yield nanofiber membranes with a relatively uniform thickness, such as, for example, 16-42 in at least one embodiment of the present invention. It should be appreciated that nanofiber membranes with such relatively uniform thickness may be used for Li-Ion battery separators. Additional steps enable the production of nanofiber membranes with thickness in the range of 30±5 particularly by electrospinning thicker nanofiber films (70-90 µm) and compacting them using a precisely controlled rolling press. It should be appreciated that the electrospinning process can be further controlled to yield high density and uniform nanofiber films, such as, for example, using an electro-blowing process, which refers to electrospinning of polymer solutions with the aid of compressed air blowing. Electro-blowing can permit formation of commercial sizes and quantities of nanofibrous films at base weights in excess of about 1 g/m² (gsm), and even up to as high as about 40 gsm or greater, in relatively short periods of time.

The porosity and electrolyte uptake of nanofiber membranes produced in accordance with at least one embodiment of the present invention were determined using a solvent (n-butanol) uptake method. In the solvent uptake test, the weight of the membrane was measured before and after soaking in n-butanol for two hours at room temperature. The porosity was calculated by the following equation:

Porosity (%)=[$(W_w-W_d)/(\rho_b \times V)$]×100, where $W_w$ and $W_d$ are the weights of n-butanol soaked membrane and dry membrane, respectively, $\rho_b$ is the density of n-butanol and V is the geometric volume of the membrane. Nanofiber membranes produced in accordance with at least one embodiment of the present invention have very high porosity due to its 3D porous network, which is due to nanofibers held together by compaction of the fibers or the presence of one or more binder layers.

TABLE 1

Porosity, permeability and electrolyte uptake data.

| Membrane | Thickness (µm) | Porosity (%) | Gurley Number (Sec) | Liquid Uptake (%) |
|---|---|---|---|---|
| Novel Membrane-1 | 25 | 50-70 | 80-100 | 155 |
| Novel Membrane-2 | 25 | 40-50 | 150-200 | 120 |
| Control* | 25 | 39 | 580-600 | 90 |

*Data from specification sheet. Celgard ® 2325 - Trilayer polypropylene-polyethylene-polypropylene (PP-PE-PP) separator.

Novel Membrane-1 is an as-fabricated nanofiber mat compressed into a membrane using a rolling press. Novel Membrane-2 is an as-fabricated nanofiber mat compressed into a membrane using a rolling press and infiltrated with solution (0.5-1.0 wt. % aqueous PVA solution).

It should be noted that Gurley numbers, which measure air permeability, are proportional to electrical resistivity for a given separator morphology. A Gurley number measurement can be used in place of electrical resistance (ER) measurements once the relationship between Gurley number and ER is established. In the above table, Gurley numbers were measured at a certified test facility (Applied Paper Technology, Inc.).

It should be appreciated that battery separators should have low Gurley numbers for good electrical performance. One of skill in the art will further appreciate that both Novel Membrane-1 and Novel Membrane-2 have significantly lower Gurley numbers as compared to control, thus demonstrating the feasibility of using nanofiber membranes produced in accordance with at least one embodiment of the present invention as battery separators, including, but not limited to, Li-Ion battery separators.

FIGS. 4A-B are thermogravimetric analysis (TGA) and differential scanning calorimeter (DSC) profiles, respectively, of the nanofiber membrane according to an embodiment of the present invention. It should be appreciated that another advantage of nanofiber membranes produced in accordance with at least one embodiment of the present invention is its thermal properties, as illustrated by the TGA and DSC profiles. The nanofiber membrane is stable up to 700° C. with weight loss of <20%, which is essentially due to loss of the solvent used to dissolve the infiltrated polymer during nanofiber membrane production. High thermal stability ensures that the membrane is effective without thermal degradation (e.g., softening, shrinking or melting) even at 700° C. It should be appreciated that such high thermal stability is advantageous in battery separator applications.

Figure 5B:
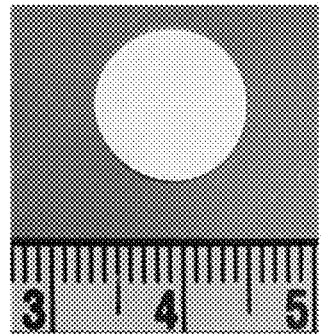
Figure 5C:
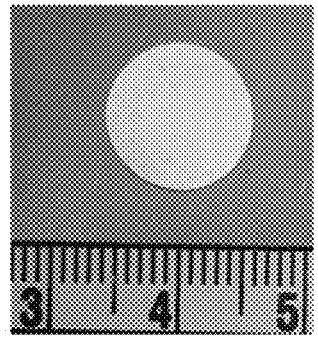

FIGS. 5A-C show thermal shrinkage of a nanofiber membrane according to an embodiment of the present invention at different temperatures, specifically at room temperature (FIG. 5A), 200° C. (FIG. 5B), and 300° C. (FIG. 5C). As is apparent from such figures, there is no, or minimal, shrinkage of the nanofiber membrane at temperatures up to 300° C. In other words, the nanofiber membrane is clearly stable at temperatures of up to 300° C., with no shrinkage after 30 minutes. One of skill in the art will appreciate that higher temperature stability, with no or minimal dimensional changes, is essential for high temperature separation or ion transport processes, such as exist in batteries.

Figure 6:
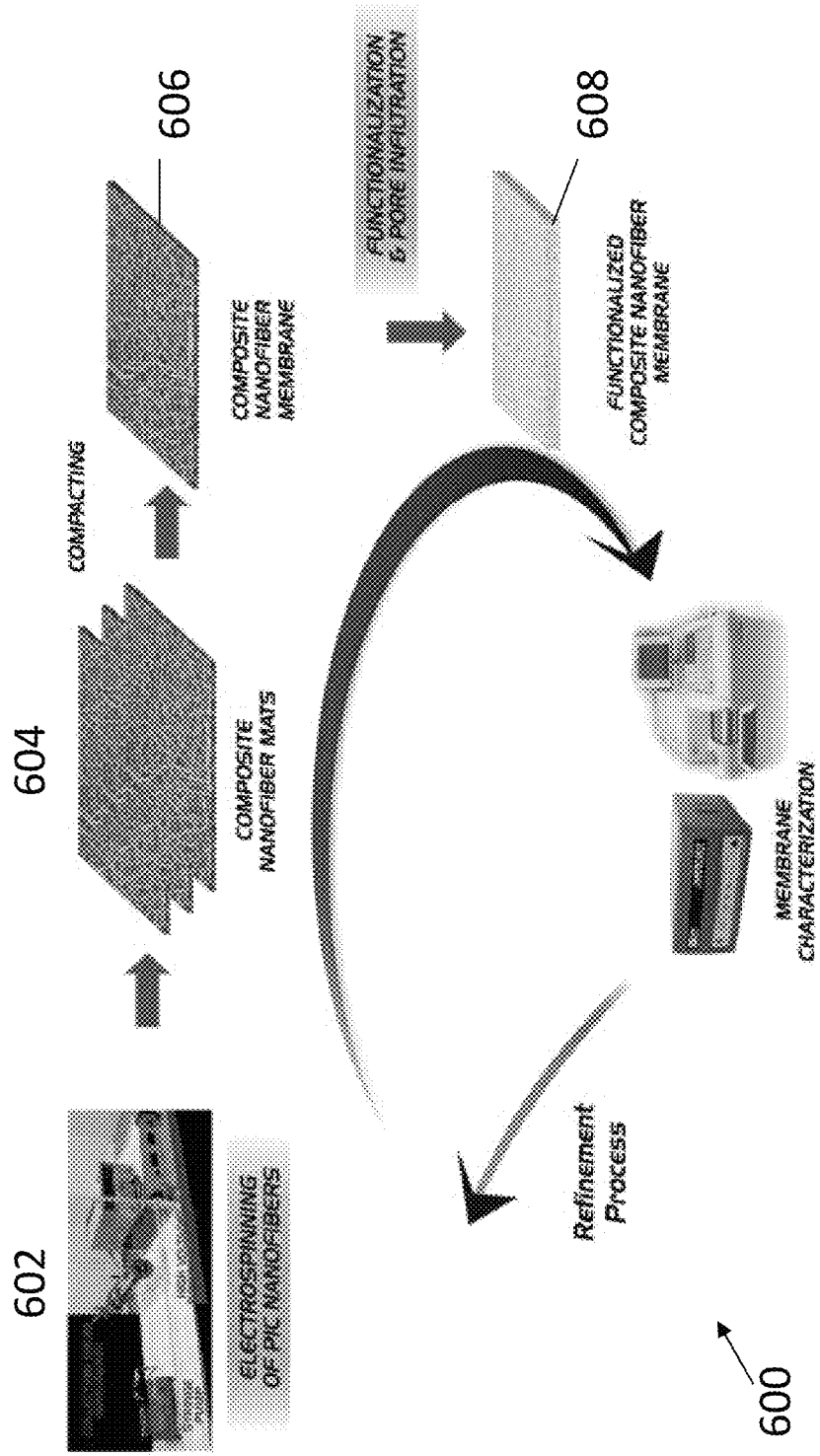
FIG. 6 illustrates a method of producing a nanofiber membrane separator, according to an embodiment of the present invention.

FIG. 6 illustrates a method 600 of producing a nanofiber membrane separator, that may then be used in a Li-Ion battery, according to an embodiment of the present invention. Nanofibers are first spun via electrospinning at step 602, thereby creating nanofiber mats 604. One or more of the nanofiber mats are then compressed to produce a nanofiber membrane 606. Additional steps, such as, for example, functionalization and pore infiltration, result in the formation of a nanofiber membrane that can act as a nanostructured separator 608. Pore infiltration may be achieved through techniques such as polymer infiltration. The nanostructured separator 608 can then be combined with a variety of other structures, such as, for example, a copper pad, copper puck, wax phase change material, and an aluminum pad, for use in forming a Li-Ion cell.

Improvements in various parameters of the nanofiber membrane may also be achieved. Purely as a non-limiting example, blending elastomeric polymers with PBI base polymer during electrospinning and improving the base weight of the nanofiber (measured in gsm) by increasing the fiber density can result in improved mechanical strength. Additionally, improved thickness uniformity and porosity distribution may be achieved by modifying various processes, including, but not limited to, nanofiber spinning, membrane fabrication, and packaging. Specifically, greater thickness uniformity may be achieved by fabricating thicker membranes via increasing base weight of the nanofiber (gsm), which can be achieved by modifying the electrospinning process with advanced spinnerets (multi-nozzle and multi-channel) and forced spinning via compressed air delivery of the polymer. Such changes improve fiber density and production capabilities.

Figure 7A:
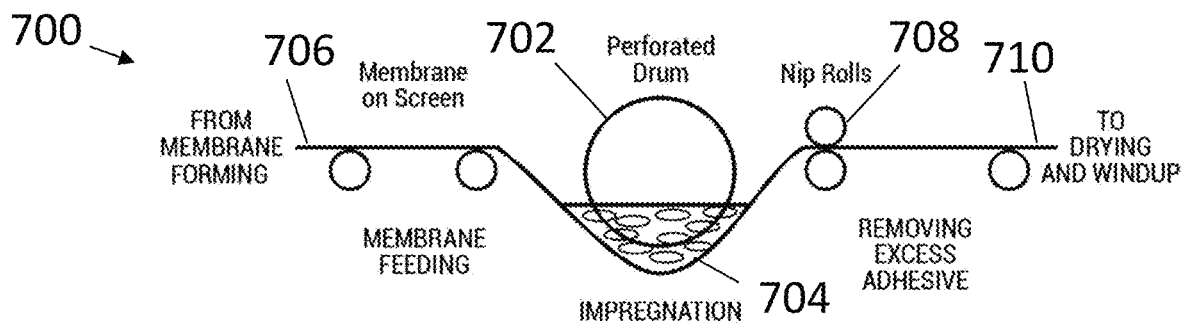
FIGS. 7A-B illustrate saturation bonding (FIG. 7A) and roller bonding (FIG. 7B) of binder on to a nanofiber membrane, according to an embodiment of the present invention.
Figure 7B:
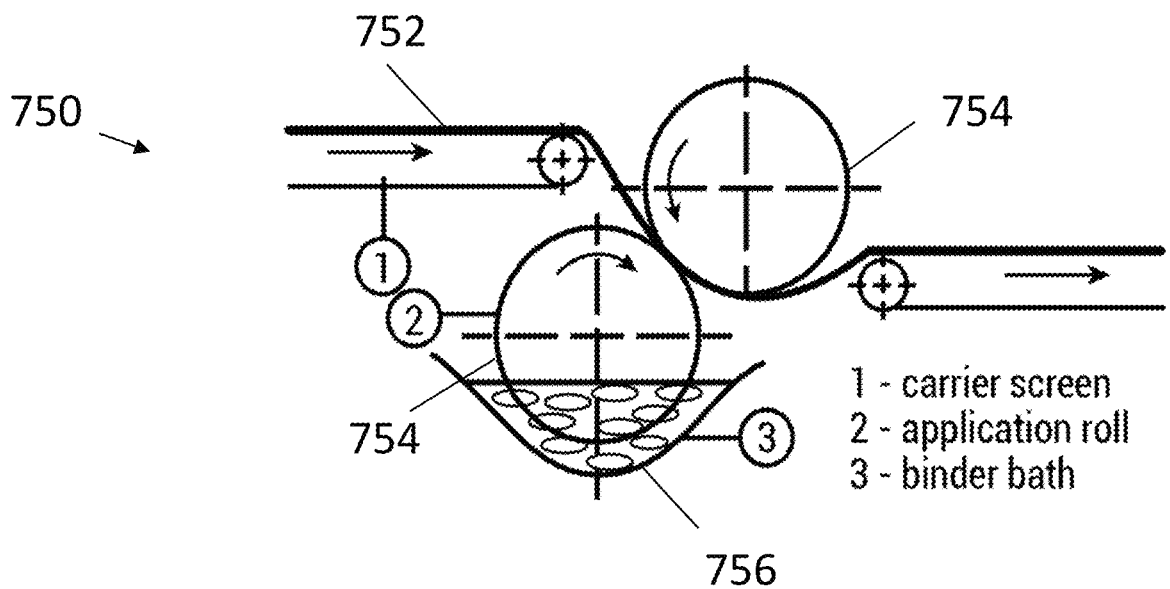

Membrane compaction using a rolling press further enables good control of thickness uniformity. Polymer binder infiltration via spray, saturation bonding, and roller bonding may also be utilized. FIGS. 7A and 7B illustrate saturation bonding (FIG. 7A) and roller bonding (FIG. 7B) of binder on to a nanofiber membrane, according to an embodiment of the present invention. These industrially established non-woven bonding processes interlock preferentially arranged fiber or film assemblies by mechanical, chemical, solvent, and/or thermal means. The degree of bonding is a primary factor in determining fabric integrity (strength), porosity flexibility, softness, and density (loft, thickness).

FIG. 7A illustrates a method 700 by which saturation bonding is used to infiltrate polymer into a nanofiber membrane. Specifically, a perforated drum 702 is used, in conjunction with a solution of polymer or binder 704, to impregnate the nanofiber membrane with the polymer or binder extant in the solution 704. The membrane 706 is fed on a screen after forming to the perforated drum 702, and after impregnation contacts nip rolls 708 which remove excess solution, and then is carried on to be dried and wound up 710.

Similarly, FIG. 7B illustrates a method 750 by which roller bonding is used to infiltrate polymer into a nanofiber membrane. Specifically, a nanofiber membrane is carried on a carrier screen 752 that comes in physical contact with multiple application rollers 754. At least one of the two application rollers 754 is in contact with a solution of polymer or binder 756. Contact between the multiple application rollers 754 and the solution of polymer or binder 756 results in impregnation of the nanofiber membrane with the polymer or binder extant in the solution 756.

After production of the nanofiber membrane, which may include one or more polymer infiltration steps as already described herein, the nanofiber membrane may be used as a nanofiber separator for use in battery applications, including, but not limited to, Li-Ion batteries. It should be appreciated that mechanical properties of the nanofiber separator may be improved in some embodiments of the present invention by incorporating elastomeric polymer blended with base PBI (or other) nanofibers. High temperature polymers such as polyacrylamide (glass transition temperature Tg=225° C.), polyacrylic acid (190° C.), and polymethacrylic acid (220° C.) can be either electrospun with the base to create composite (e.g., PBI+other polymer) nanofibers or used as a binder for bonding the electrospun polymer nanofibers, such as, for example, infiltrating a nanofiber membrane to produce a composite (e.g., PBI or PVA+other polymer) nanofiber membrane.

Purely as a non-limiting example, in at least one embodiment of the present invention, PVA and PBI nanofibers were infiltrated with silicone polymer to improve the mechanical strength of nanofiber membranes. It can be seen that for both PVA and PBI nanofibers, infiltrating with silicone results in increased tensile strength and strain (% elongation) as compared to base polymer fibers. Subsequently, blending PVA and PBI polymers in specific proportions gives significant improvement in mechanical properties as compared to unblended polymer systems.

TABLE 2

Mechanical properties of PVA and PBI nanofiber infiltrated with Silicone.

| Polymer Nanofiber | Tensile Strength [psi] | Standard Deviation | Strain, % Elongation | Standard Deviation |
|---|---|---|---|---|
| PVA (TD*) | 2468 | 343 | 21 | 0.06 |
| PVA (MD*) | 2332 | 633.4 | 20 | 0.06 |
| PVA + Si (TD) | 2185 | 137 | 25 | 0.02 |
| PVA + Si (MD) | 2404 | 202 | 28 | 0.02 |
| PBI (TD) | 328 | 51.4 | 2.4 | 0.00 |
| PBI (MD) | 285 | 60.5 | 2 | 0.00 |
| PBI + Si (TD) | 1294 | 57.9 | 2.8 | 0.00 |
| PBI + Si (MD) | 546 | 71.4 | 3.2 | 0.01 |

*MD refers to machine direction (i.e., the direction of rotation of the rollers on which the fibers are collected) and TD refers to the transverse direction (perpendicular to the MD) in reference to the fiber orientation obtained during the nanofiber membrane production process.

Given the desirable mechanical, thermal, and other properties of the nanofiber membranes already described herein, it should be appreciated that embodiments of the present invention are useful for battery and consumer electronics manufacturing, in the electric automotive industry, for space exploration, and for many defense, aerospace, filtration, desalination, chemical separation, industrial, and household applications.

The invention is not limited to the particular embodiments illustrated in the drawings and described above in detail. Those skilled in the art will recognize that other arrangements could be devised. The invention encompasses every possible combination of the various features of each embodiment disclosed. One or more of the elements described herein with respect to various embodiments can be implemented in a more separated or integrated manner than explicitly described, or even removed or rendered as inoperable in certain cases, as is useful in accordance with a particular application. While the invention has been described with reference to specific illustrative embodiments, modifications and variations of the invention may be constructed without departing from the spirit and scope of the invention as set forth in the following claims.

What is claimed is:

1. A method for producing a nanostructured separator comprising compressed mats of electrospun high temperature polymer nanofibers infiltrate with additional polymer, the high temperature polymer comprising polybenzimidazole (PBI) and the additional polymer comprising silicone, the method comprising:
    electrospinning the high temperature polymer into the electrospun high temperature polymer nanofibers;
    forming one or more nanofiber mats from the electrospun high temperature polymer nanofibers;
    compressing the one or more nanofiber mats to generate the compressed mats; and
    infiltrating the compressed mats with the additional polymer, thereby bonding at least some of the electrospun high temperature polymer nanofibers in the compressed mats and controlling pore size of the compressed mats, to form the nanostructured separator.

2. The method of claim 1, wherein the high temperature polymer further comprises polyether ether ketone (PEEK), polysulfone, polyvinyl alcohol (PVA), and/or polyethylenimine (PEI).

3. The method of claim 1, wherein the compression of the one or more nanofiber mats utilizes a force of 10-50 kN.

4. The method of claim 1, wherein the additional polymer used to infiltrate the compressed mats further comprises polyvinyl alcohol (PVA), polyacrylamide, polyacrylic acid, PEI, and/or polymethacrylic acid.

5. The method of claim 1, further comprising assembling a lithium-ion battery using the nanostructured separator.

6. The method of claim 1, wherein the electrospinning further comprises using a polymer flow rate of about 0.001 ml/min, a range of one to 16 nozzles wherein one or more nozzles in the range have a size of 23-20 gauge needles, and an applied voltage of 10-40 kV.

7. A nanostructured separator, comprising:
    compressed mats of electrospun high temperature polymer nanofibers infiltrated with additional polymer,
    wherein the high temperature polymer comprises polybenzimidazole (PBI),
    wherein the additional polymer comprises silicone.

8. The nanostructured separator of claim 7, wherein at least one of the high temperature polymer nanofibers has a glass transition temperature of between 190 degrees Celsius and 425 degrees Celsius.

9. The nanostructured separator of claim 7, wherein the electrospun high temperature polymer nanofibers further comprise at least one of polyvinyl alcohol (PVA), polyether ether ketone (PEEK), polysulfone, silicone, and polyethylenimine (PEI).

10. The nanostructured separator of claim 7, wherein the electrospun high temperature polymer nanofibers are between 20 nm to 500 nm in diameter and between 1 and 10 cm in length, and wherein the electrospun high temperature polymer nanofibers have a length/diameter aspect ratio between 1,000 and 1,000,000.

11. The nanostructured separator of claim 7, wherein the additional polymer further comprises polyvinyl alcohol (PVA), polyacrylamide, polyacrylic acid, and/or polymethacrylic acid.

12. The nanostructured separator of claim 7, wherein a porosity of the compressed mats is about 50% less than a porosity of as-spun electrospun high temperate polymer nanofibers of a same material.

13. The method of claim 1, wherein the electrospinning step further comprises electro-blowing.

14. A nanofiber membrane, comprising:
    a plurality of compressed nanofibers, wherein the plurality of compressed nanofibers comprises one or more high temperature polymers; and
    a binder, wherein the binder is complexed with at least some of the plurality of compressed nanofibers,
    wherein the one or more high temperature polymers comprises polyvinyl alcohol (PVA), wherein the binder comprises silicone, and wherein the plurality of compressed nanofibers has a tensile strength of between 2050 psi and 2600 psi.

15. The nanofiber membrane of claim 14, wherein the one or more high temperature polymers further comprises polybenzimidazole (PBI), polyether ether ketone (PEEK), polysulfone, silicone, and/or polyethylenimine (PEI).

16. The nanofiber membrane of claim 14, wherein the plurality of compressed nanofibers is between 20 nm to 500 nm in diameter and between 1 and 10 cm in length, and wherein the plurality of compressed nanofibers has a length/diameter aspect ratio between 1,000 and 1,000,000.

17. The nanofiber membrane of claim 14, wherein the binder comprises a polymer different than the plurality of high temperature polymers.

18. The nanofiber membrane of claim 17, wherein the polymer comprises polyvinyl alcohol (PVA), polyacrylamide, polyacrylic acid, and/or polymethacrylic acid.

19. The nanofiber membrane of claim 14, wherein the plurality of compressed nanofibers has a porosity of about 50% less than a porosity of a plurality of as-spun electrospun high temperature polymer nanofibers of a same material.

20. The nanofiber membrane of claim 14, wherein the nanofiber membrane has a thickness between 25 μm and 35 μm.

21. The nanofiber membrane of claim 14, wherein the plurality of compressed nanofibers consists of PBI and wherein the binder consists of 0.5 wt % to 1 wt % polyvinyl alcohol (PVA).

22. The nanofiber membrane of claim 14, wherein at least one of the one or more high temperature polymers has a glass transition temperature of between 190 degrees Celsius and 425 degrees Celsius.

23. The nanofiber membrane of claim 14, wherein the one or more high temperature polymers is 13 wt % PBI in N,N'-dimethyl acetamide (DMAc).

24. A nanofiber membrane, comprising:
    a plurality of compressed nanofibers, wherein the plurality of compressed nanofibers comprises one or more high temperature polymers; and a binder, wherein the binder is complexed with at least some of the plurality of compressed nanofibers, wherein the one or more high temperature polymers is PBI, wherein the binder is silicone, and wherein the plurality of compressed nanofibers has a tensile strength of between 480 psi and 1350 psi.

25. A nanofiber membrane, comprising:

a plurality of compressed nanofibers, wherein the plurality of compressed nanofibers comprises one or more high temperature polymers; and a binder, wherein the binder is complexed with at least some of the plurality of compressed nanofibers, wherein the one or more high temperature polymers is PBI, and wherein the binder is polyacrylamide.

26. A nanofiber membrane, comprising:

a plurality of compressed nanofibers, wherein the plurality of compressed nanofibers comprises one or more high temperature polymers; and a binder, wherein the binder is complexed with at least some of the plurality of compressed nanofibers, wherein the one or more high temperature polymers is PBI, and wherein the binder is polyacrylic acid.

27. A nanofiber membrane, comprising:

a plurality of compressed nanofibers, wherein the plurality of compressed nanofibers comprises one or more high temperature polymers; and a binder, wherein the binder is complexed with at least some of the plurality of compressed nanofibers, wherein the one or more high temperature polymers is PBI, and wherein the binder is polymethacrylic acid.

* * * * *